United States Patent
Kannan

(10) Patent No.: US 9,223,570 B2
(45) Date of Patent: Dec. 29, 2015

(54) MIGRATION ASSISTANCE USING COMPILER METADATA

(71) Applicant: Red Hat, Inc., Raleigh, NC (US)

(72) Inventor: Shakthi Kannan, Magarpatta (IN)

(73) Assignee: Red Hat, Inc., Raleigh, NC (US)

( * ) Notice: Subject to any disclaimer, the term of this patent is extended or adjusted under 35 U.S.C. 154(b) by 92 days.

(21) Appl. No.: 13/886,054

(22) Filed: May 2, 2013

(65) Prior Publication Data

US 2014/0282439 A1 Sep. 18, 2014

(30) Foreign Application Priority Data

Mar. 14, 2013 (IN) .............................. 743/DEL/2013

(51) Int. Cl.
G06F 9/44 (2006.01)
G06F 9/45 (2006.01)

(52) U.S. Cl.
CPC ....................................... *G06F 8/76* (2013.01)

(58) Field of Classification Search
None
See application file for complete search history.

(56) References Cited

U.S. PATENT DOCUMENTS

| | | | | |
|---|---|---|---|---|
| 5,815,713 A * | 9/1998 | Sanders | .................... | G06F 8/22 717/137 |
| 5,918,053 A * | 6/1999 | Graham | ........................ | 717/127 |
| 6,434,742 B1 * | 8/2002 | Koepele, Jr. | ............... | G06F 8/54 717/140 |
| 6,658,421 B1 * | 12/2003 | Seshadri | ............... | G06F 9/4428 717/140 |
| 7,043,720 B2 * | 5/2006 | Kuzmin | .................... | G06F 8/33 717/137 |
| 7,127,707 B1 | 10/2006 | Mishra et al. | | |
| 7,441,237 B2 * | 10/2008 | Warren | ..................... | G06F 8/41 717/140 |
| 7,587,708 B2 | 9/2009 | King | | |
| 7,802,240 B2 * | 9/2010 | Reinhold | .................. | G06F 8/42 717/137 |
| 8,032,860 B2 * | 10/2011 | Piehler | .................... | G06F 17/21 717/140 |
| 8,051,410 B2 | 11/2011 | Marfatia et al. | | |
| 8,171,462 B2 * | 5/2012 | Ahs | .......................... | G06F 8/41 717/137 |
| 8,341,132 B2 * | 12/2012 | DeFrang | ...................... | 707/695 |

(Continued)

FOREIGN PATENT DOCUMENTS

JP 10293683 A 11/1998

OTHER PUBLICATIONS

Do, "Compilation Integration: A Solution for the Challenge of developing and reusing ADA Software on Different Platforms"; 1992 Springer; [retrieved on Oct. 13, 2014]; Retrieved from Internet <URL:http://www.springerlink.com/index/71k6482w20034mxj.pdf>; pp. 230-241.*

(Continued)

*Primary Examiner* — Xi D Chen
(74) *Attorney, Agent, or Firm* — Haynes and Boone, LLP

(57) ABSTRACT

Systems and methods are migration assistance using compiler metadata. An example system includes a data module that receives data associated with a compiler. The data includes a set of rules associated with the compiler. The example system also includes an extraction module that extracts from the data, compiler metadata including the set of rules associated with the compiler. The example system further includes a database that stores the compiler metadata. The example system also includes a patch module that receives a program including source code, retrieves from the database the compiler metadata, and generates, without compiling the received program, a set of migration patches based on the received program and the compiler metadata. The set of migration patches includes one or more changes to the received program to abide by the set of rules associated with the compiler.

20 Claims, 7 Drawing Sheets

(56) References Cited

U.S. PATENT DOCUMENTS

| | | | | |
|---|---|---|---|---|
| 8,473,937 | B2* | 6/2013 | Oberhauser | G06F 8/51 717/168 |
| 8,549,492 | B2* | 10/2013 | Mola Marti | G06F 9/4448 717/137 |
| 8,578,363 | B2* | 11/2013 | Sah et al. | 717/169 |
| 8,695,075 | B2* | 4/2014 | Anderson et al. | 726/8 |
| 8,782,632 | B1* | 7/2014 | Chigurapati | G06F 8/65 717/168 |
| 8,850,414 | B2* | 9/2014 | Payette | G06F 8/41 717/140 |
| 9,038,048 | B2* | 5/2015 | Yang | G06F 9/52 717/168 |
| 2006/0075401 | A1* | 4/2006 | Smegner | 717/174 |
| 2007/0130232 | A1* | 6/2007 | Therrien et al. | 707/204 |
| 2008/0320583 | A1* | 12/2008 | Sharma et al. | 726/12 |
| 2010/0235835 | A1* | 9/2010 | Nishiguchi et al. | 718/1 |
| 2014/0089925 | A1* | 3/2014 | Weber | 718/1 |
| 2014/0137104 | A1* | 5/2014 | Nelson et al. | 718/1 |

OTHER PUBLICATIONS

Melnik, et al., "Compiling Mappings to bridge Applications and Databases", 2007 ACM; [retrieved on Aug. 20, 2015]; Retrieved from Internet <URL:http://dl.acm.org/citation.cfm?id=1247480.1247532>;pp. 461-472.*

Duszynski, "A Scalable Goal-Oriented Approach to Software Variability Recovery", 2011 ACM; [retrieved on Aug. 20, 2015]; Retrieved from Internet <URL:http://dl.acm.org/citation.cfm?id=2019136.2019185>; pp. 1-8.*

Xia, et al., "Cross-Project Build Co-change Prediction", 2015 IEEE; [retrieved on Aug. 20, 2015]; Retrieved from Internet <URL:http://ieeexplore.ieee.org/stamp/stamp.jsp?tp=&arnumber=7081841>; pp. 311-320.*

Yu, et al., "Ontology Model-based Static Analysis on Java Programs", 2008 IEEE;[retrieved on Aug. 20, 2015]; Retrieved from Internet <URL:http://ieeexplore.ieee.org/stamp/stamp.jsp?tp=&arnumber=4591539>; pp. 92-99.*

Frey et al. "Model-Based Migration of Legacy Software Systems into the Cloud: The CloudMIG Approach." Last accessed May 1, 2013. Web <http://pi.informatik.uni-siegen.de/stt/30_2/01_Fachgruppenberichte/WSR2010/28-frey-hassebring.pdf>.

Hanan. "Migrating TFS Content to the Cloud." Nov. 14, 2012. Last Accessed May 1, 2013. Web. <http://blogs.interknowlogy.com/2012/11/14/migrate-tfs-cloud/>.

"TFS Integration Platform." Last accessed May 1, 2013. Web<http://tfsintegration.codeplex.com/>.

* cited by examiner

MIGRATION ASSISTANCE USING COMPILER METADATA

BACKGROUND

The present disclosure generally relates to a computing system, and more particularly to data about compilers.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. The compiler may be used to develop the source code and ensure that it executes properly.

A compiler translates an input program written in a programming language into an equivalent program in another language. In particular, the compiler takes a program written in a high-level programming language as input and translates the program into an equivalent program in a low-level language such as machine language or assembly language. The program written in the high-level language may be referred to as the source program, and the program converted into the low-level language may be referred to as the object (or target) program. After compilation of the source program, the target program may be loaded into memory for execution.

At a later point in time, the user may be interested in a different compiler. To migrate a computer program to the new compiler may be complicated. For example, a user may need to manually install the new compiler, compile the computer program with the new compiler, review warning and error outputs, and manually change and test the computer program to be compatible with the new compiler. This may be time consuming and tedious.

BRIEF SUMMARY

This disclosure relates to assistance in migrating computer programs using compiler metadata. Methods, systems, and techniques for migration assistance using compiler metadata are provided.

According to an embodiment, a system for migration assistance using compiler metadata includes a data module that receives data associated with a compiler. The data includes a set of rules associated with the compiler. The system also includes an extraction module that extracts from the data, compiler metadata including the set of rules associated with the compiler. The system further includes a database that stores the compiler metadata. The system also includes a patch module that receives a source program, retrieves from the database the compiler metadata, and generates, without compiling the received program, a set of migration patches based on the received program and the compiler metadata. The set of migration patches includes one or more changes to the received program to abide by the set of rules associated with the compiler.

According to another embodiment, a method of migration assistance using compiler metadata includes receiving, by one or more processors, data associated with a compiler. The data includes a set of rules associated with the compiler. The method also includes extracting from the data, compiler metadata including the set of rules associated with the compiler. The method further includes storing the compiler metadata in a database. The method also includes receiving a program including source code. The method further includes retrieving from the database the compiler metadata. The method also includes generating, without compiling the received program, a set of migration patches based on the received program and the compiler metadata. The set of migration patches includes one or more changes to the received program to abide by the set of rules associated with the compiler.

According to another embodiment, a non-transitory machine-readable medium includes a plurality of machine-readable instructions that when executed by one or more processors are adapted to cause the one or more processors to perform a method including receiving data associated with a compiler, the data including a set of rules associated with the compiler; extracting from the data, compiler metadata including the set of rules associated with the compiler; storing the compiler metadata in a database; receiving a program including source code; retrieving from the database the compiler metadata; and generating, without compiling the received program, a set of migration patches based on the received program and the compiler metadata, the set of migration patches including one or more changes to the received program to abide by the set of rules associated with the compiler.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

I. Overview
II. Example System Architecture
 A. Data Associated With a Compiler
 B. Compiler Metadata
 C. Migration Patches
III. Compare Compiler Changes Using Compiler Metadata
IV. Optimizations
 A. Code Optimization
 B. Scaling Out to the Cloud
V. Example Methods
VI. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A compiler may be used to compile a program including source code into executable code. An initial compiler may refer to a compiler that has previously compiled the program. A target compiler may refer to a compiler that has not been used to compile the program. The user may be considering on whether or not to use the target compiler to develop the computer program.

A user may develop a solution on a chosen platform using specific development tools, such as a specific version of a compiler. Changes may exist in a new compiler release, and the user may be hesitant to migrate his or her software to the new compiler. For example, if the user switches to another compiler, the user may receive compilation errors or warnings when compiling the program using the new compiler. If too many warnings and errors result, the user may decide to stick with the older developments tools rather than migrate to the new development tools.

The user may desire to understand the effects of migrating his or her computer programs to use the new development tools. It may be desirable to provide the user with a description of changes or fixes associated with using the new compiler to apply to the computer programs. For example, the user may be provided with patches that can fix compiler related issues. This disclosure provides assistance to users interested in migrating software using an automated technique with little user intervention.

II. Example System Architecture

Figure 1:
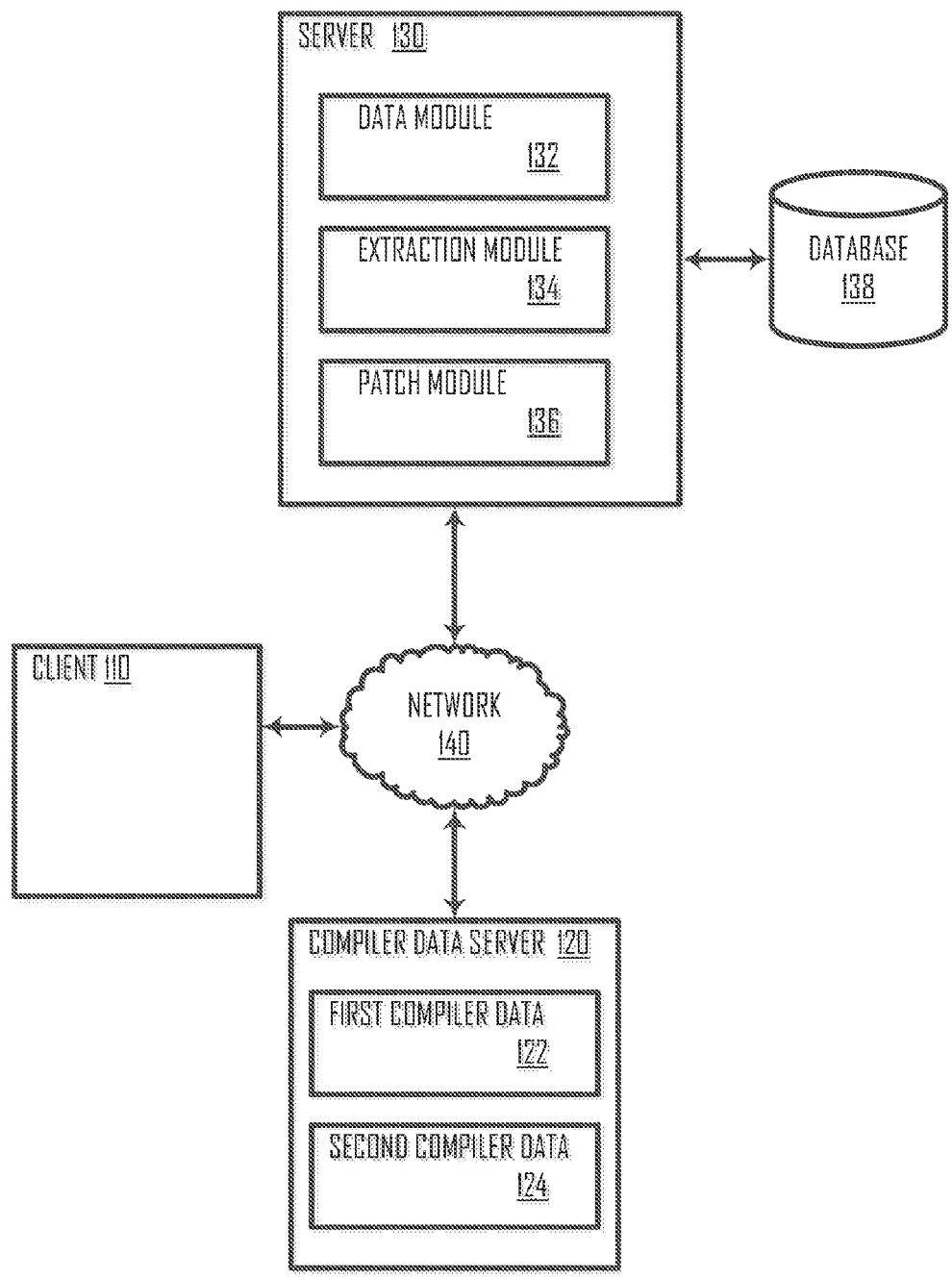
FIG. 1 is a simplified block diagram illustrating a system for migration assistance using compiler metadata, according to an embodiment.

FIG. 1 is a simplified block diagram 100 illustrating a system for migration assistance using compiler metadata, according to an embodiment.

Diagram 100 includes a client 110, compiler data server 120, and server 130 coupled to a network 140. Each of client 110, compiler data server 120, and server 130 may communicate with each other via network 140.

Network 140 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Client 110 may send requests to and receive responses from server 130 over network 140. In an example, a user may use client 110 to send a request to server 130 for information regarding one or more compilers. In an example, the user includes the program including source code and specifies a particular compiler as a parameter in the request to server 130.

In an example, the compiler specified in the input is a target compiler to which the user is thinking of migrating the program. If the user decides to migrate the program along with any of its dependencies to the target compiler, it may be desirable to migrate the software such that it is compatible with the target compiler. For instance, if the user initially used compiler version 1.0 and has later been informed that compiler version 5.0 is available, the user may want the option to migrate to compiler version 5.0. To determine whether to migrate, the user may be interested in how the migration would affect the program, such as changes to make to the program such that compiler version 5.0 compiles the program with minimal errors or warnings.

In another example, the compiler specified in the input is the initial compiler. For instance, the user may have changed the originally compiled program and may be concerned that the changes may break the code.

Server 130 may provide a set of migration patches to the user that indicates one or more changes to the program based on the input. The one or more changes to the program indicate to the user changes that would be made to the program to enable compatibility with the compiler. In an example, the one or more changes to the program avoids one or more warnings based on compilation of the program using the compiler. In another example, the one or more changes to the received program avoids one or more errors based on compilation of the received program using the compiler.

In another example, the user only includes the program including the source code. In this example, server 130 may only provide assistance with one compiler. In another example, the user may request information on a set of compilers. In an example, a user may wish to receive compiler information about a specific software release version 1.0 of a compiler to determine whether any warnings or errors would result if the user compiled the program using the compiler.

A. Data Associated with a Compiler

A compiler data server includes data associated with one or more compilers. In FIG. 1, compiler data server 120 includes first compiler data 122 that is associated with a first compiler and second compiler data 124 that is associated with a second compiler.

The following is a description of first compiler data 122. This description applies as well to second compiler data 124. Compiler data 122 may include documentation regarding the first compiler. For example, compiler data 122 may include a manual that documents how to use the first compiler as well as its features and incompatibilities, how to port the internals of the first compiler to new targets, and logic on how different phases of the compiler behave. The first compiler may read in a program including source code, check the syntax and semantics of the program, and translate the program to an intermediate form that interprets the language-specific operation of the program. First compiler data 122 may include a description of the process in which the first compiler scans the source program by reading in individual characters, creates a string of tokens, and parses the token stream. Examples of tokens are reserved words, names, operators, and punctuation symbols.

First compiler data 122 may include a set of rules associated with the first compiler. In an example, the set of rules includes a set of syntax rules. In an example, first compiler data 122 includes a description of the process in which the first compiler applies the set of syntax rules associated with the first compiler. In this way, the first compiler may ensure that the program abides by the syntax rules. First compiler data 122 may further include a description of the process in which the first compiler produces an abstract syntax tree that is a representation of the syntactic structure of the program. The set of syntax rules may include grammar rules that verify the structure of the abstract syntax tree.

In another example, the set of rules includes a set of semantic rules. First compiler data 122 may include a description of the process in which the first compiler checks the program for semantic correctness. Semantic checks may ensure that variables and types are properly declared and that the types of operators and objects match, a step called type checking During this process, the first compiler may create a symbol table representing all the named objects—classes, variables, and functions—and use the symbol table to type check the program.

Compiler data server 120 may send to server 130 data associated with one or more compilers (e.g., first compiler data 122 and second compiler data 124). Server 130 includes a data module 132 and is coupled to a database 138. Server 130 may be coupled to database 138 over network 140 or may be on disk. In an embodiment, data module 132 receives data associated with a compiler. In an example, data module 132 receives first compiler data 122 that is associated with a first compiler and second compiler data 124 that is associated with a second compiler.

Data module 132 may receive data associated with a compiler based on various events. For example, a compiler may have a release cycle, and data module 132 may track the compiler's release cycle. As new releases of a compiler are available, data module 132 may import the data associated with the particular compiler over, for example, network 140. Data module 132 may store the received compiler data in database 138. In another example, data module 132 is registered on a mailing list to receive compiler release cycle information. Compiler data server 120 may automatically send to data module 132 first compiler data 122 based on data module 132 being on the mailing list. If second compiler data 124 is associated with a second compiler that has become available, compiler data server 120 may automatically send to data module 132 second compiler data 124.

In another example, data module 132 sends a request to compiler data server 120 for data associated with the first compiler. In response to the request, compiler data server 120 may send to data module 132 first compiler data 122. Data module 132 may become aware that the second compiler that is associated with second compiler data 124 is available. Data module 132 may then send a request to compiler data server 120 for data associated with the second compiler. In response to the request, compiler data server 120 may send to data module 132 second compiler data 124.

The compiler data may also include one or more patches that compiler data server 120 may send to data module 132. In an example, data module 132 receives a patch associated with the first compiler and stores the patch in database 138.

B. Compiler Metadata

Server 130 includes an extraction module 134 and patch module 136. Extraction module 134 may parse the compiler data and extract from the compiler data, specific compiler information. In an embodiment, extraction module 134 extracts from the compiler data, compiler metadata including the set of rules associated with the compiler. Compiler metadata may include the grammar rules of the compiler and the rules to scan the source program for tokens. Extraction module 134 may store the compiler metadata in database 138.

The compiler data may also include patches that compiler data server 120 may send to data module 132. In an example, extraction module 134 extracts from the patch, compiler metadata. It may be useful to extract metadata from the patch because it the features included in the patch may be an indication of potential features in the next compiler release.

The compiler metadata (e.g., data associated with grammar, parser, and analyzer associated with a compiler) of different compilers or interpreters is periodically stored in database 138. The compiler metadata may be analyzed with the program including the source code to determine one or more changes to the program that may prevent one or more errors or warnings from the compiler associated with the compiler metadata.

C. Migration Patches

In an embodiment, patch module 136 receives a program including source code and retrieves from database 138 the compiler metadata. The compiler metadata may be associated with a compiler that specified by the user in the request to server 130. Patch module 136 may generate, without compiling the received program, a set of migration patches based on the received program and the compiler metadata. The set of patches may include one or more changes to the received program to abide by the set of rules associated with the compiler. The changes may help fix compiler related warnings or errors.

Patch module 136 may provide the set of migration patches to the user. In an example, patch module 136 transmits the set of migration patches to the user over network 140, and client 110 receives the set of migration patches. The set of patches may be associated with different compilers as a means to assess or review code changes before choosing to switch to a particular compiler.

As discussed, patch module 136 may analyze the compilers and provide the set of migration patches based on the analysis without compiling the program. This technique may be faster than source to source compilation. For example, the source to source complication may include compiling the program using a first compiler and a second compiler and then comparing the differences in the results of the compilation. This may be time consuming because the user would wait until the program has been compiled by both compilers. Further, source to source compilation may only get the user so far because errors may be fatal and the compilation may stop when an error is detected.

III. Compare Compiler Changes Using Compiler Metadata

Figure 2:
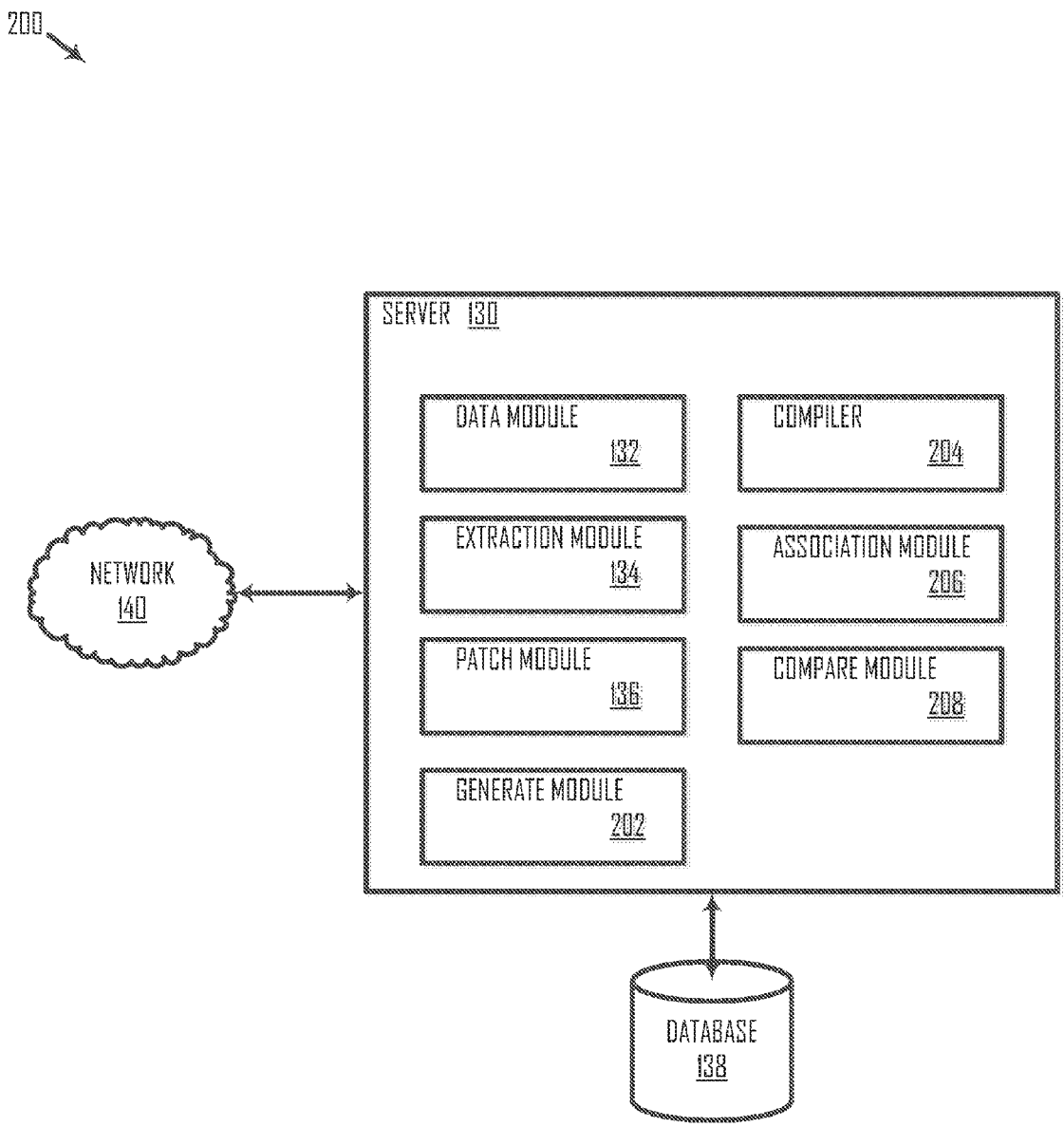
FIG. 2 is a simplified block diagram illustrating another system for migration assistance using compiler metadata, according to an embodiment.

FIG. 2 is a simplified block diagram 200 illustrating another system for migration assistance using compiler metadata, according to an embodiment. Diagram 200 includes server 130 coupled to network 140. Server 130 includes data module 132, extraction module 134, and patch module 136, and is coupled to database 138.

The user may determine whether to apply or not apply the migration patch to the program. Even if the user does not apply the migration patch to the program, the user has gained some benefit from this disclosure because the user is aware of changes that the user may need to make to the program to ensure it is compatible with a particular compiler.

Server 130 also includes a generate module 202 and a compiler 204. In an embodiment, generate module 202 enables a user to generate a new program by applying one or more migration patches of the first set of migration patches to the initial program received from the user as input. In an example, the migration patch includes source code and contains the differences between the initial program and the generated program. The migration patch may include the files in the program to which the patch should be applied. Alternatively, the user may specify the files in the program to which the patch should be applied via a command line tool. In an example, to apply the patch to the program, patch module 136 parses the program, identifies one or more locations in the program to modify the code, and replaces the identified one or more locations with the appropriate change identified in the migration patch.

In an example, the user applies the migration patch to the program, builds a new program, and then executes the new program. Generate module 202 may enable the user to compile the generated program using compiler 204. Compiler 204 may receive as input the generated program and generate a machine representation of the second program (e.g., output executable code) that the user may automatically run. Compiler 204 may be the initial compiler or the target compiler (e.g., a release of a new compiler) that is specified by the user input. Generate module 202 may also enable the user to execute the machine representation of the generated program. One or more processors may execute the executable code. A result of the compilation of the generated program may be indicated in the set of migration patches.

It may also be desirable to compare two compilers and determine changes between them. In an example, a user may currently use a specific compiler version 1.0 and wish to compare the compiler version 1.0 with compiler version 2.0 to determine whether to migrate to compiler version 2.0. In the end, the user may decide to continue with compiler version 1.0, but would have been informed of one or more changes to make to the program including the source code so that it is compatible with compiler version 2.0.

As discussed above, database 138 may include compiler metadata that may be used to determine one or more sets of rules associated with the compiler. The compiler metadata may be compared and a set of migration patches may be sent to the user based on the comparison. The set of migration patches may include one or more changes to the program so that it is compatible with one or more target compilers. In an example, a new version of the first compiler becomes available. New compiler data is available via compiler data server 120. In an example, the first and second compilers are of a common compiler type, and the second compiler is a newer version of the first compiler. In another example, the first and second compilers are of a different compiler type In FIG. 2, server 130 also includes an association module 206 and a compare module 208. In an embodiment, association module 206 receives an input specifying the first compiler as a first target compiler and specifying the second compiler as a second target compiler. The user may write a program including source code and include the initial compiler used to compile the program and also include a target compiler to which the user is thinking about migrating. In an example, the user invokes an API with the program, initial compiler, and target compiler as input.

Association module 206 may identify the first compiler metadata as being associated with the first target compiler and identify the second compiler metadata as being associated with the second target compiler. In an example, data module 132 is associated with a first compiler and receives data associated with the first compiler. The data associated with the first compiler includes a set of rules associated with the first compiler. Similarly, data module 132 may also be associated with a second compiler and receives data associated with the second compiler. The data associated with the second compiler includes a set of rules associated with the second compiler.

In an embodiment, compare module 208 compares the first and second compiler metadata and identifies one or more differences between the first and second compiler metadata based on the comparison. Compare module 208 may store the one or more differences between the first and second compiler metadata into the database.

In an embodiment, patch module 136 receives a request for a set of migration patches that includes one or more changes to the received program to abide by the set of rules associated with one or more target compilers. In response to the request, patch module 136 retrieves from database 138 the one or more differences between the first and second compiler metadata and generates, without compiling the received program, the set of migration patches based on the received program and the one or more differences between the first and second compiler metadata.

Database 138 stores the compiler metadata associated with the compiler. This information may be valuable because it includes a set of rules associated with the compiler (e.g., grammar rules and the logic on how different phases of the compiler behave). Based on the user input, patch module 136 may create a migration patch to ensure that no warnings or errors are generated based on compiling the program with the target compiler. In this way, patch migration 136 seeks to minimize or prevent these warnings or errors by fixing them before the program is actually compiled. The migration patch with one or more changes can be sent to the user. The generated migration patch may depend on the different target compiler options.

In an example, data module 132 receives data associated with one or more compilers via the backend and compare module 208 compares the compiler requirements. When a request is received from the user for a migration patch, the request may be serviced in real time rather than wait until after the program has been compiled by a target compiler. This may provide the user with benefits in receiving near instantaneous migration patches that can assist them in determining whether to migrate their software.

In an embodiment, generate module 202 enables the user to generate a second program by applying one or more migration patches of the set of migration patches to the program. The one or more migration patches may be based on based on the program and the one or more differences between the first and second compiler metadata. Generate module 202 may also enable the user to compile the second program using the second compiler and enable the user to execute the second program. A result of the compilation of the second program may be indicated in the set migration patches.

As discussed above and further emphasized here, FIGS. 1-3 are merely examples, which should not unduly limit the scope of the claims. For example, although block diagram 100 is described herein with reference to server 130 receiving compiler data associated with the first and second compilers, server 130 may receive compiler data associated with more than two compilers.

Figure 3:
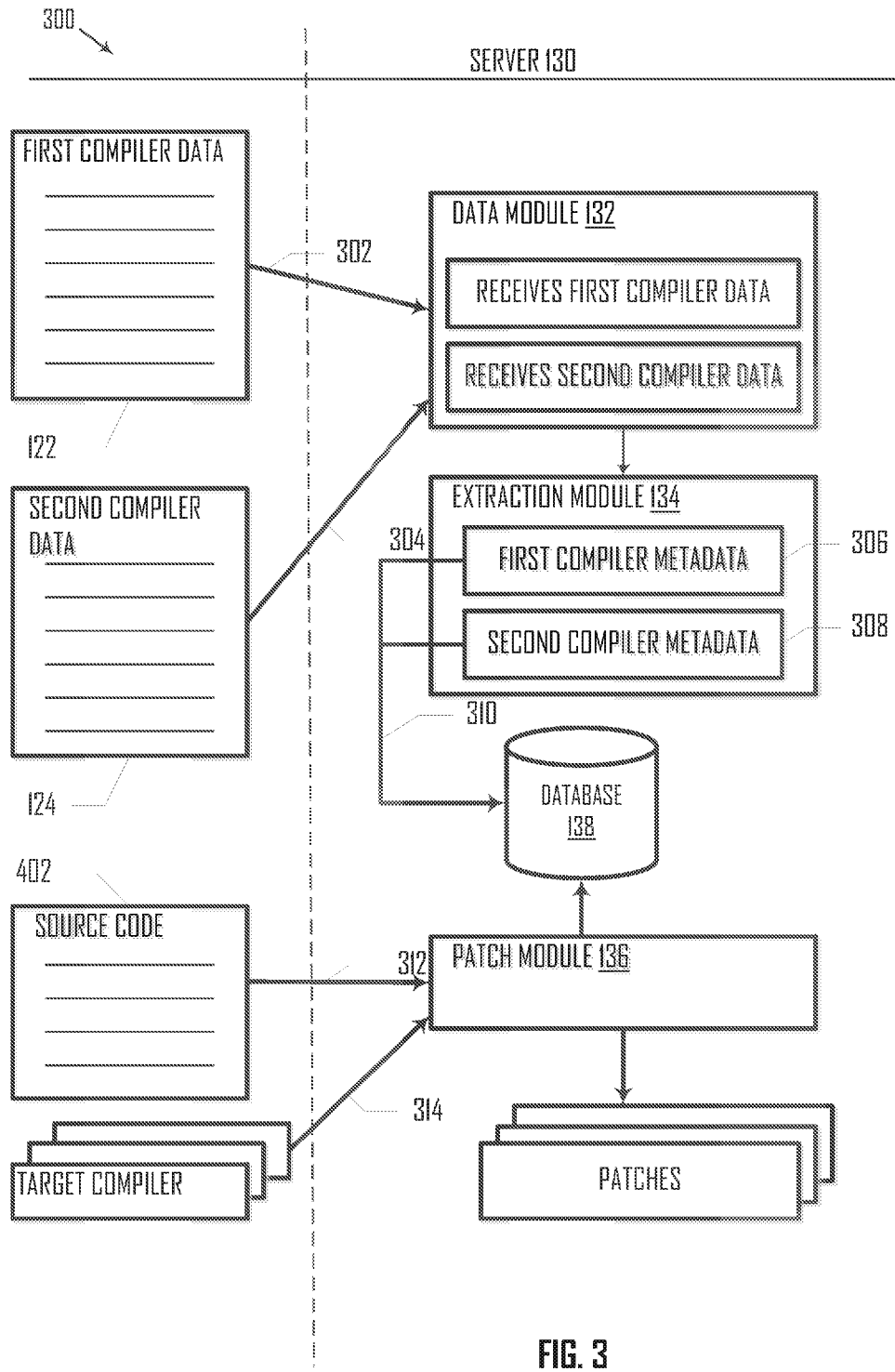
FIG. 3 is a simplified swim diagram illustrating migration assistance using compiler metadata, according to an embodiment.

Further, it should be understood that one or more modules (e.g., data module 132, extraction module 134, patch module 136, generate module 202, compiler 204, association module 206, and compare module 208) in FIGS. 1-3 may be combined with another module. In an example, at least one of data module 132, extraction module 134, patch module 136 is combined into one module. It should also be understood that one or more modules in FIGS. 1-3 may be separated into more than one module. In an example, data module 132 is split into a data module and a second data module. In this example, server 130 may include data modules 132A and 132B (not shown), and data module 132A may be associated with the first compiler and receive data associated with the first compiler, and data module 132B may be associated with the second compiler and receive data associated with the second compiler.

Additionally, each of the components in FIGS. 1-3 may reside in a machine different from that shown in FIG. 1. For example, data module 132 may reside in a first physical machine and extraction module 134 and patch module 136 may reside in a second physical machine different from the first physical machine.

FIG. 3 is a simplified swim diagram 300 illustrating migration assistance using compiler metadata, according to an embodiment. At a step 302 data module 132 receives first compiler data 122 associated with a first compiler. At a step 304 data module 132 receives second compiler data 124 associated with a second compiler. First compiler data 122 may include a first set of rules associated with the first compiler, and second compiler data 124 may include a second set of rules associated with the second compiler. Data module 132 may store first compiler data 122 and second compiler data 124 into database 138.

At a step 306 extraction module 134 extracts from first compiler data 122, first compiler metadata including the first set of rules associated with the first compiler. At a step 308 extraction module 134 extracts from second compiler data 124, second compiler metadata including the second set of rules associated with the second compiler. At a step 310, extraction module 134 may store the first compiler metadata and the second compiler metadata into database 138.

Data module 132 may receive compiler data at different times, and extraction module 134 may extract from the compiler data, the metadata at different times. For example, data module 132 may receive second compiler data 124 before or after extraction module 134 extracts from first compiler data 122, the first metadata.

At a step 312, patch module receives a program including source code 402. At a step 314, patch module receives an input specifying one or more target compilers. In an example, the input includes an input specifying the first compiler as a first target compiler and the second compiler as a second target compiler. The user may be given the option of whether to compare the targets compilers to each other to determine their differences. In this example, patch module 136 may retrieve from database 138 the one or more differences between the first and second compiler metadata and generate, without compiling the received program, the set of migration patches based on the received program and the one or more differences between the first and second compiler metadata. If the first compiler is the initial compiler used, the user may then determine the benefits and costs to switching from the initial compiler to the target compiler.

Alternatively, the user may be given the option of independently determining one or more changes to the program based on the different targets compilers. In this example, patch module 136 may retrieve from database 138 the first compiler metadata and generate, without compiling the received program, a set of migration patches based on the received program and the first compiler metadata. The set of migration patches based on the received program and the first compiler metadata may include one or more changes to the program to abide by the set of rules associated with the first compiler. Patch module 136 may also retrieve from database 138 the second compiler metadata and generate, without compiling the received program, a set of migration patches based on the received program and the second compiler metadata. The set of migration patches based on the received program and the second compiler metadata may include one or more changes to the program to abide by the set of rules associated with the second compiler. The user may then determine which target compiler may be more beneficial to use.

V. Optimizations

A. Code Optimization

A compiler may be complicated technology, and developers may not understand the effect the compiler has on the program. For example, the compiler may exploit hardware enhancements by determining capabilities of new chip designs and transform an application into highly-tuned machine code that optimally performs on the new hardware. Further, the compiler may optimize the program. For example, the compiler may transform an application into a significantly more efficient version of itself by recognizing inefficient programming practices and converting them into more efficient ones.

In an example, an application may involve a lot of computation, and the user may wish to determine how fast the computation can be performed given some hardware (e.g., 4 GPU cores). Database 128 stores compiler metadata that may be analyzed to assist the user to determine how fast the computation can be performed given some hardware.

Additionally, a compiler may generate code for different hardware architectures (e.g., ARM devices). Developers may not understand the low-level details of the hardware to code an efficient program. In an embodiment, patch module 136 generates a migration patch that optimizes the program. Using the migration patch, the user may identify how the code may be optimized. For example, the migration patch may include changes to the original program and suggest constructs or libraries to use. Program module 136 may abstract logic from the source code provided in the user's program to generate different instructions for different types of hardware architectures. Patch module 136 may perform a static analysis on the different instructions to determine how much power will be consumed using a particular type of hardware, and may generate a report on hypothetical power consumption given the program and hardware. The user may then be able to intelligently determine whether to use that specific hardware (e.g., a particular processor).

B. Scaling Out to the Cloud

When server 130 receives a request for a set of migration patches, the analysis may be performed on a single server (e.g., server 130) or in parallel with different virtual machines. The analysis of the compiler data and/or compiler metadata may be performed on the virtual machines on the backend. In this way, faster performance may be provided to the user.

Figure 4:
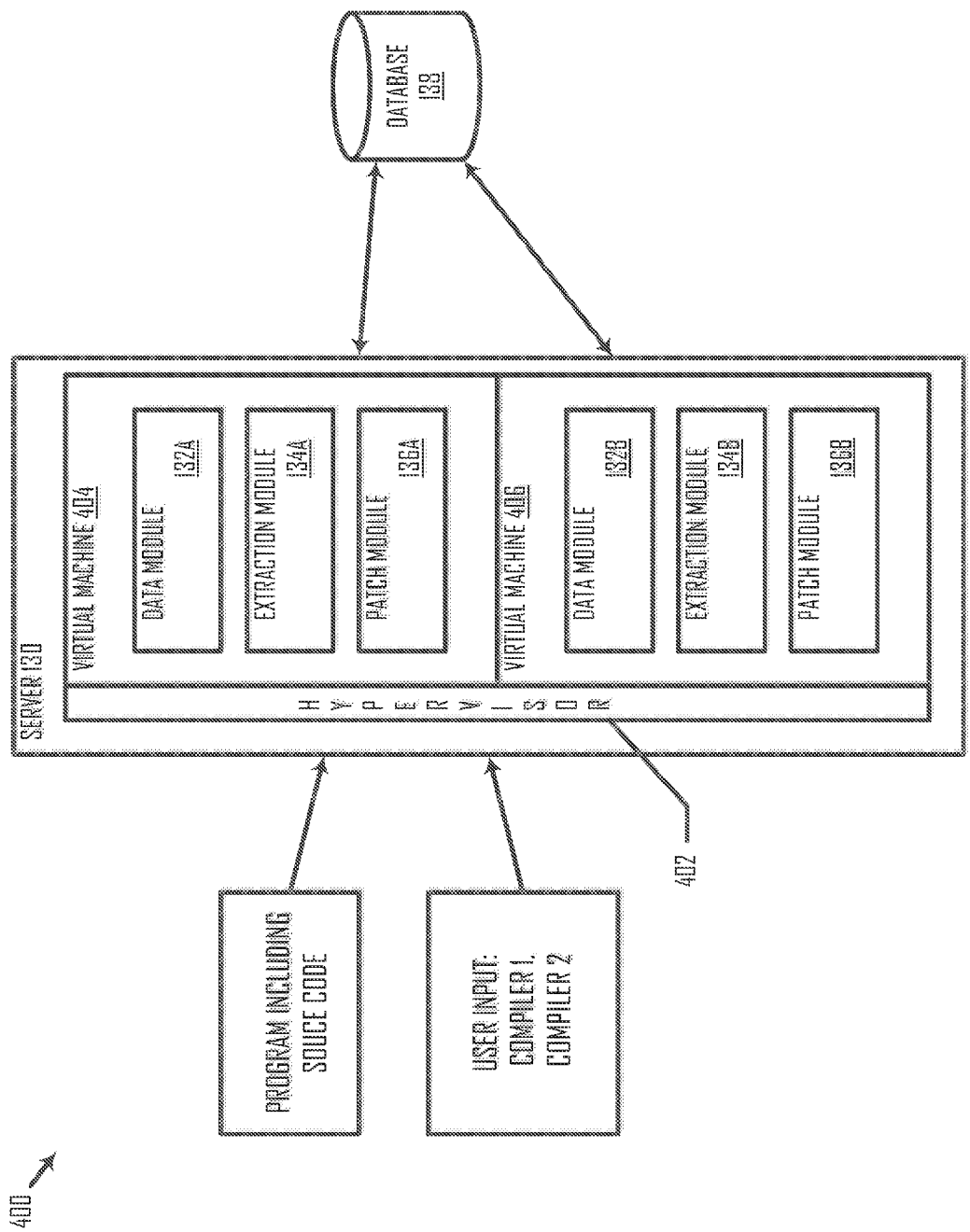
FIG. 4 is a simplified block diagram illustrating a system including virtual machines for migration assistance using compiler metadata, according to an embodiment.

FIG. 4 is a simplified block diagram 400 illustrating a system including virtual machines for migration assistance using compiler metadata, according to an embodiment.

Diagram 400 includes server 130 that receives a program including source code and user input specifying a first compiler and a second compiler. Server 130 may be referred to as a host machine that hosts a set of virtual machines. Server 130 includes a hypervisor 402 that creates virtual machines 404 and 406. Virtual machine 404 includes data module 132A, extraction module 132A, and patch module 136A and is coupled to database 138. Similarly, virtual machine 406 includes data module 132B, extraction module 134B, and patch module 136B and is coupled to database 138.

Data module 132A and 132B may encode the compiler data into a backend cloud having a separate input process that imports compiler data in parallel. Implementing the input process in a backend application and periodically importing the compiler data may be fast and effective when server 130 desires to receive quick compiler updates and provide quick analysis of compiler metadata and output of migration patches.

When multiple target compilers are specified in the input, hypervisor 402 may start multiple virtual machines to analyze the program with the different compiler metadata. For example, virtual machine 404 may generate a first set of migration patches based on the programming including the source code and the first compiler, and virtual machine 406 may generate a second set of migration patches based on the programming including the source code and the second compiler. Each of the virtual machines may return the results to server 130. Server 130 may transmit the set of migration patches to client 110.

V. Example Methods

Figure 5:
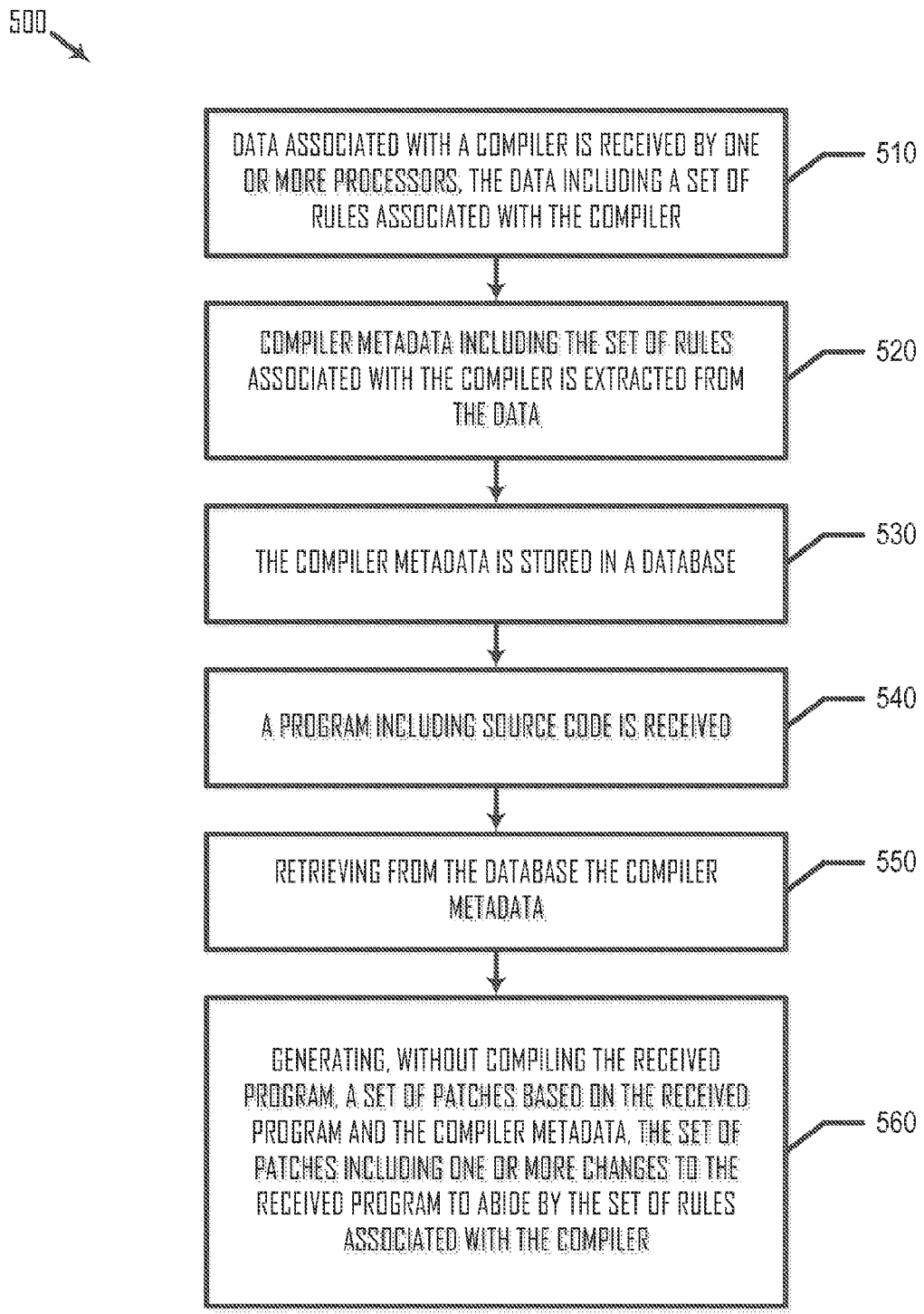
FIG. 5 is a simplified flowchart illustrating a method of migration assistance using compiler metadata, according to an embodiment.

FIG. 5 is a simplified flowchart illustrating a method 500 of migration assistance using compiler metadata, according to an embodiment. Method 500 is not meant to be limiting and may be used in other applications.

Method 500 includes steps 510-560. In a step 510, data associated with a compiler is received by one or more processors, the data including a set of rules associated with the compiler. In an example, data module 132 receives, by one or more processors, data associated with a compiler, the data including a set of rules associated with the compiler. In a step 520, compiler metadata including the set of rules associated with the compiler is extracted from the data. In an example, extraction module 134 extracts from the data, compiler metadata including the set of rules associated with the compiler. In a step 530, the compiler metadata is stored in a database. In an example, extraction module 134 stores the compiler metadata in a database.

In a step 540, a program including source code is received. In an example, patch module 136 receives a program including source code. In a step 550, the compiler metadata is retrieved from the database. In an example, patch module 136 retrieves from the database the compiler metadata.

In a step 560, without compiling the received program, a set of migration patches based on the received program and the compiler metadata is generated, the set of migration patches including one or more changes to the received program to abide by the set of rules associated with the compiler. In an example, patch module 136 generates, without compiling the received program, a set of migration patches based on the received program and the compiler metadata, the set of migration patches including one or more changes to the received program to abide by the set of rules associated with the compiler.

It is also understood that additional method steps may be performed before, during, or after steps 510-560 discussed above. For example, method 500 may include a step of enabling a user to generate a second program by applying one or more migration patches of the set of migration patches to the received program. It is also understood that one or more of the steps of method 500 described herein may be omitted, combined, or performed in a different sequence as desired.

Figure 6:
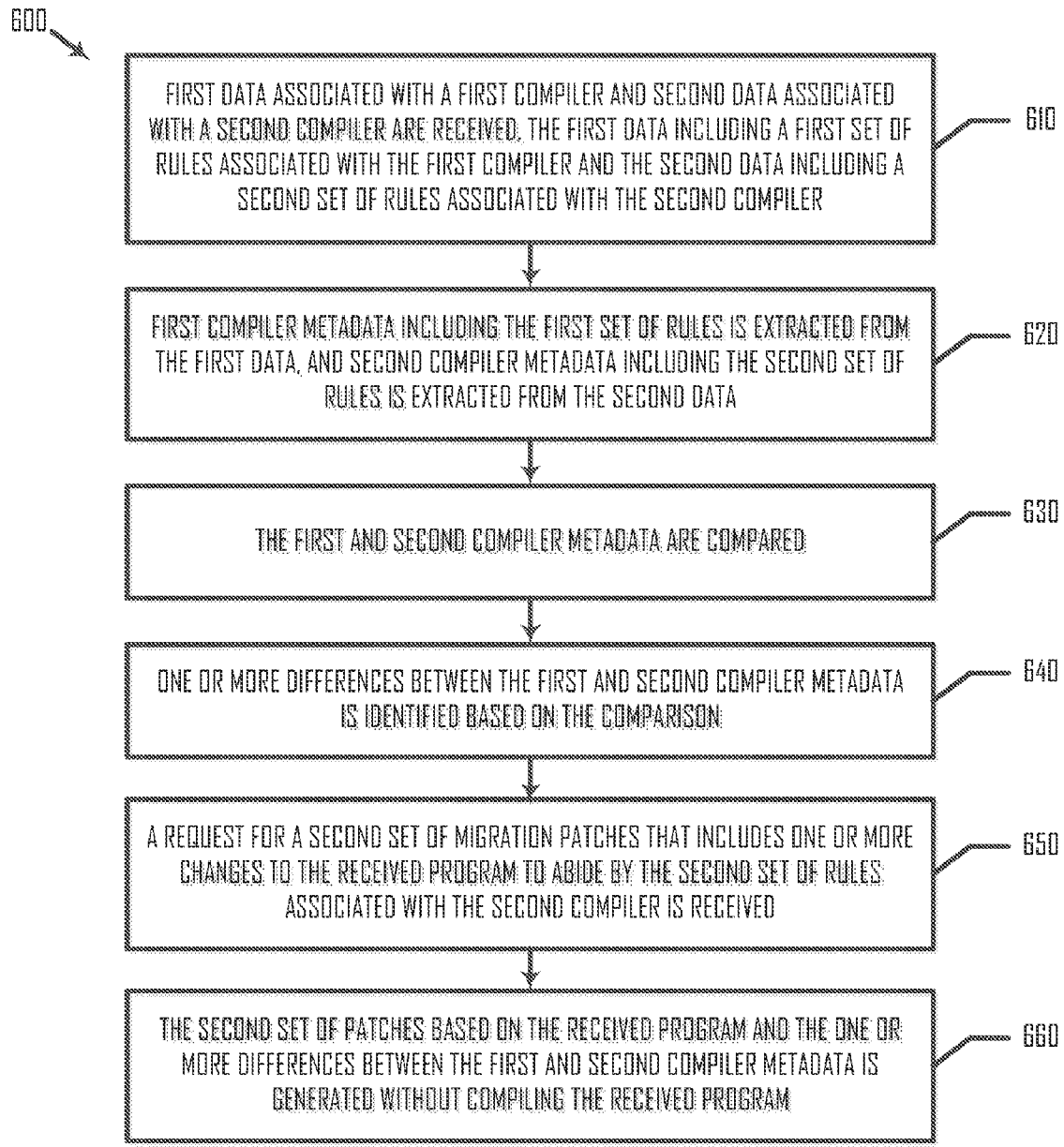
FIG. 6 is a simplified flowchart illustrating another method of migration assistance using compiler metadata, according to an embodiment.

FIG. 6 is a simplified flowchart illustrating a method 600 of migration assistance using compiler metadata, according to an embodiment. Method 600 is not meant to be limiting and may be used in other applications.

Method 600 includes steps 610-660. In a step 610, first data associated with a first compiler and second data associated with a second compiler are received, the first data including a first set of rules associated with the first compiler and the second data including a second set of rules associated with the second compiler. In an example, data module 132 receives first data associated with a first compiler and second data associated with a second compiler, the first data including a first set of rules associated with the first compiler and the second data including a second set of rules associated with the second compiler.

In a step 620, first compiler metadata including the first set of rules is extracted from the first data, and second compiler metadata including the second set of rules is extracted from the second data. In an example, extraction module 134 extracts from the first data, first compiler metadata including the first set of rules, and extracts from the second data, second compiler metadata including the second set of rules.

In a step 630, the first and second compiler metadata are compared. In an example, compare module 208 compares the first and second compiler metadata. In a step 640, one or more differences between the first and second compiler metadata is identified based on the comparison. In an example, compare module 208 identifies one or more differences between the first and second compiler metadata based on the comparison.

In a step 650, a request for a second set of migration patches that includes one or more changes to the received program to abide by the second set of rules associated with the second compiler is received. In an example, patch module 136 receives a request for a second set of migration patches that includes one or more changes to the received program to abide by the second set of rules associated with the second compiler.

In a step 660, the second set of migration patches based on the received program and the one or more differences between the first and second compiler metadata is generated without compiling the received program. In an example, generate module 202 generates, without compiling the received program, the second set of migration patches based on the received program and the one or more differences between the first and second compiler metadata.

It is also understood that additional method steps may be performed before, during, or after steps 610-660 discussed above. It is also understood that one or more of the steps of method 600 described herein may be omitted, combined, or performed in a different sequence as desired.

VI. Example Computing System

Figure 7:
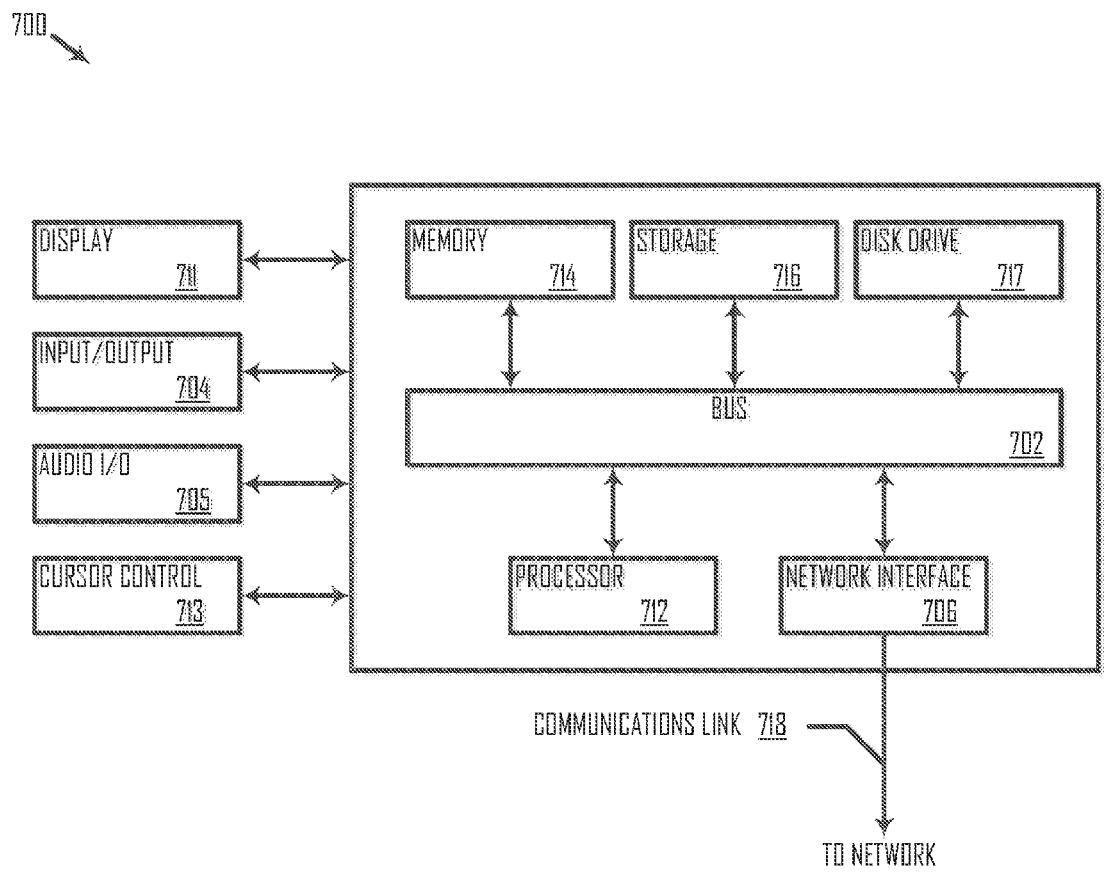
FIG. 7 is a block diagram of a computer system suitable for implementing one or more embodiments of the present disclosure.

FIG. 7 is a block diagram of a computer system 700 suitable for implementing one or more embodiments of the present disclosure. In various implementations, host machine 101 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component such as a display 711, and an input control such as a cursor control 713 (such as a keyboard, keypad, mouse, etc.). An optional audio input/output component 705 may also be included to allow a user to use voice for inputting information by converting audio signals into information signals. Audio I/O component 705 may allow the user to hear audio. A transceiver or network interface 706 transmits and receives signals between computer system 700 and other devices via a communication link 718 to a network. In an embodiment, the transmission is wireless, although other transmission mediums and methods may also be suitable. A processor 712, which may be a micro-controller, digital signal processor (DSP), or other processing component, processes these various signals, such as for display on computer system 700 or transmission to other devices via communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 714, and transmission media includes coaxial cables, copper wire, and fiber optics, including wires that include bus 702. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A computer-implemented method of migration assistance using compiler metadata comprising:
   receiving first data associated with a first compiler, the first data including a first set of rules associated with the first compiler;
   receiving second data associated with a second compiler, the second data including a second set of rules associated with the second compiler;
   extracting first compiler metadata from the first data, the first compiler metadata including the first set of rules associated with the first compiler;
   extracting second compiler metadata from the second data, the second compiler metadata including the second set of rules associated with the second compiler;
   comparing the first and second compiler metadata;
   identifying one or more differences between the first and second compiler metadata based on the comparison;
   storing the one or more differences into a database;
   receiving a program including source code;
   retrieving the one or more differences between the first and second compiler metadata from the database; and
   generating, without compiling the received program, a set of migration patches based on the received program and the one or more differences between the first and second compiler metadata.

2. The method of claim 1, comprising:
   generating a second program by applying one or more migration patches of the set of migration patches to the first program;
   compiling the second program using the second compiler; and
   executing the second program, a result of the compilation of the second program being indicated in the set of migration patches.

3. The method of claim 1, comprising:
   generating, without compiling the received program, a second set of migration patches based on the received program and the first compiler metadata, wherein the second set of migration patches includes one or more changes to the received program to abide by the set of rules associated with the first compiler.

4. The method of claim 3, further comprising:
   generating a second program by applying one or more migration patches of the second set of migration patches to the first program;
   compiling the second program using the second compiler; and
   executing the second program, a result of the compilation of the second program being indicated in the second set migration patches.

5. A non-transitory machine-readable medium comprising a plurality of machine-readable instructions that when executed by one or more processors are adapted to cause the one or more processors to perform a method comprising:
   receiving, by one or more processors, first data associated with a first compiler, the first data including a first set of rules associated with the first compiler;
   receiving second data associated with a second compiler, the second data including a second set of rules associated with the second compiler;
   extracting first compiler metadata from the first data, the first compiler metadata including the first set of rules associated with the first compiler;

extracting second compiler metadata from the second data, the second compiler metadata including the second set of rules associated with the second compiler;
comparing the first and second compiler metadata;
identifying one or more differences between the first and second compiler metadata based on the comparison;
storing the one or more differences into a database;
receiving a program including source code;
retrieving the one or more differences between the first and second compiler metadata from the database; and
generating, without compiling the received program, a set of migration patches based on the received program and the one or more differences between the first and second compiler metadata.

6. A system for migration assistance using compiler metadata, the system comprising:
one or more processors;
a first data module, executable on the one or more processors, that receives first data associated with a first compiler, wherein the first data includes a first set of rules associated with the first compiler;
a second data module that receives second data associated with a second compiler, wherein the second data includes a second set of rules associated with the second compiler;
an extraction module that extracts first compiler metadata from the first data and extracts second compiler metadata from the second data, the first compiler metadata including the first set of rules associated with the first compiler, the second compiler metadata including the second set of rules associated with the second compiler;
a database that stores the first compiler metadata and the second compiler metadata in a memory;
a compare module that compares the first and second compiler metadata, identifies one or more differences between the first and second compiler metadata based on the comparison, and stores the one or more differences into the database; and
a patch module that receives a program, retrieves the one or more differences between the first and second compiler metadata from the database and generates, without compiling the received program, a set of migration patches based on the received program and the one or more differences between the first and second compiler metadata.

7. The system of claim 6, further comprising:
a generate module that generates a second program by applying one or more migration patches of the set of migration patches to the first program.

8. The system of claim 7, wherein the generate module compiles the second program using the second compiler to generate a machine representation of the second program, and executes the machine representation of the second program, wherein a result of the compilation of the second program is indicated in the set of migration patches.

9. The system of claim 6, wherein the patch module receives a request for the set of migration patches that includes one or more changes to the received program to abide by the second set of rules associated with the second compiler.

10. The system of claim 6, further comprising:
a host machine that hosts a set of virtual machines including a first virtual machine and a second virtual machine, wherein the first virtual machine includes the first data module, the second virtual machine includes the second and is coupled to the database.

11. The system of claim 6, further comprising:
an association module that receives an input specifying the first compiler as a first target compiler and specifying the second compiler as a second target compiler, identifies the first compiler metadata as being associated with the first target compiler, and identifies the second compiler metadata as being associated with the second target compiler.

12. The system of claim 6, wherein the first compiler has previously compiled the received program, wherein the first compiler is different from the second compiler.

13. The system of claim 6, wherein the first and second compilers are of a common compiler type, and the second compiler is a newer version of the first compiler.

14. The system of claim 6, wherein the patch module sends the set of migration patches to a user.

15. The system of claim 6, wherein the compare module identifies one or more differences between the first and second sets of rules, and the patch module generates, without compiling the received program, the set of migration patches based on the received program and the one or more differences between the first and second sets of rules.

16. The system of claim 7, wherein the generate module compiles the second program using the second compiler, and executes the second program, wherein a result of the compilation of the second program is indicated in the second set migration patches.

17. The system of claim 6, further comprising:
a host machine that hosts a set of virtual machines including a first virtual machine and a second virtual machine, wherein the first virtual machine includes the first data module, and is coupled to the database, and
the second virtual machine is coupled to the database and includes the second data module.

18. The system of claim 6, wherein one or more changes to the received program avoids one or more warnings based on compilation of the received program using the second compiler.

19. The system of claim 6, wherein one or more changes to the received program avoids one or more errors based on compilation of the received program using the second compiler.

20. The system of claim 6, wherein the second set of rules associated with the second compiler are at least one of a set of syntax rules and a set of semantic rules.

* * * * *